March 20, 1956 F. S. PRESTON ET AL 2,738,924
ELECTRICAL ELEVATION ANGLE COMPUTER
Filed Jan. 18, 1950 4 Sheets-Sheet 3

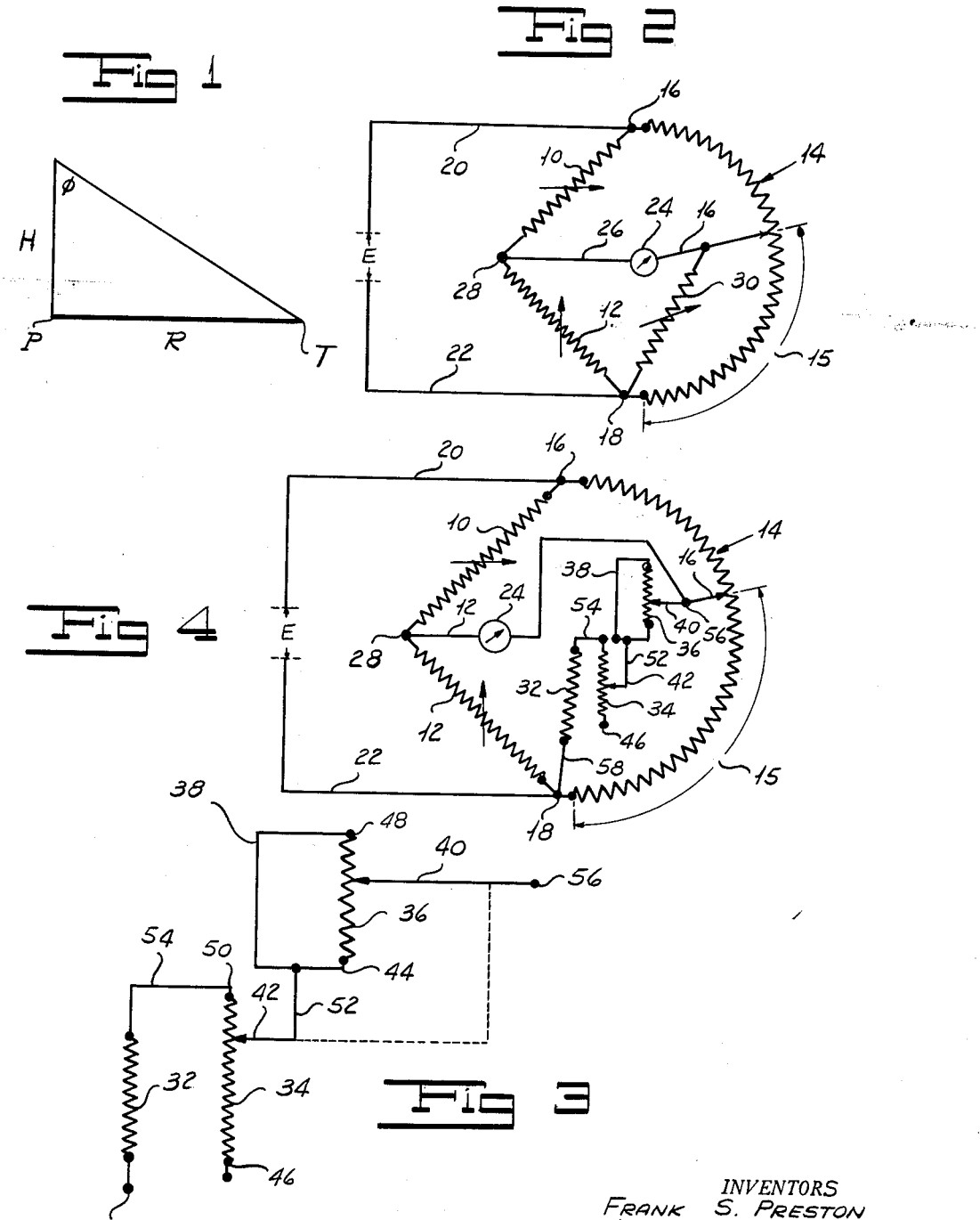

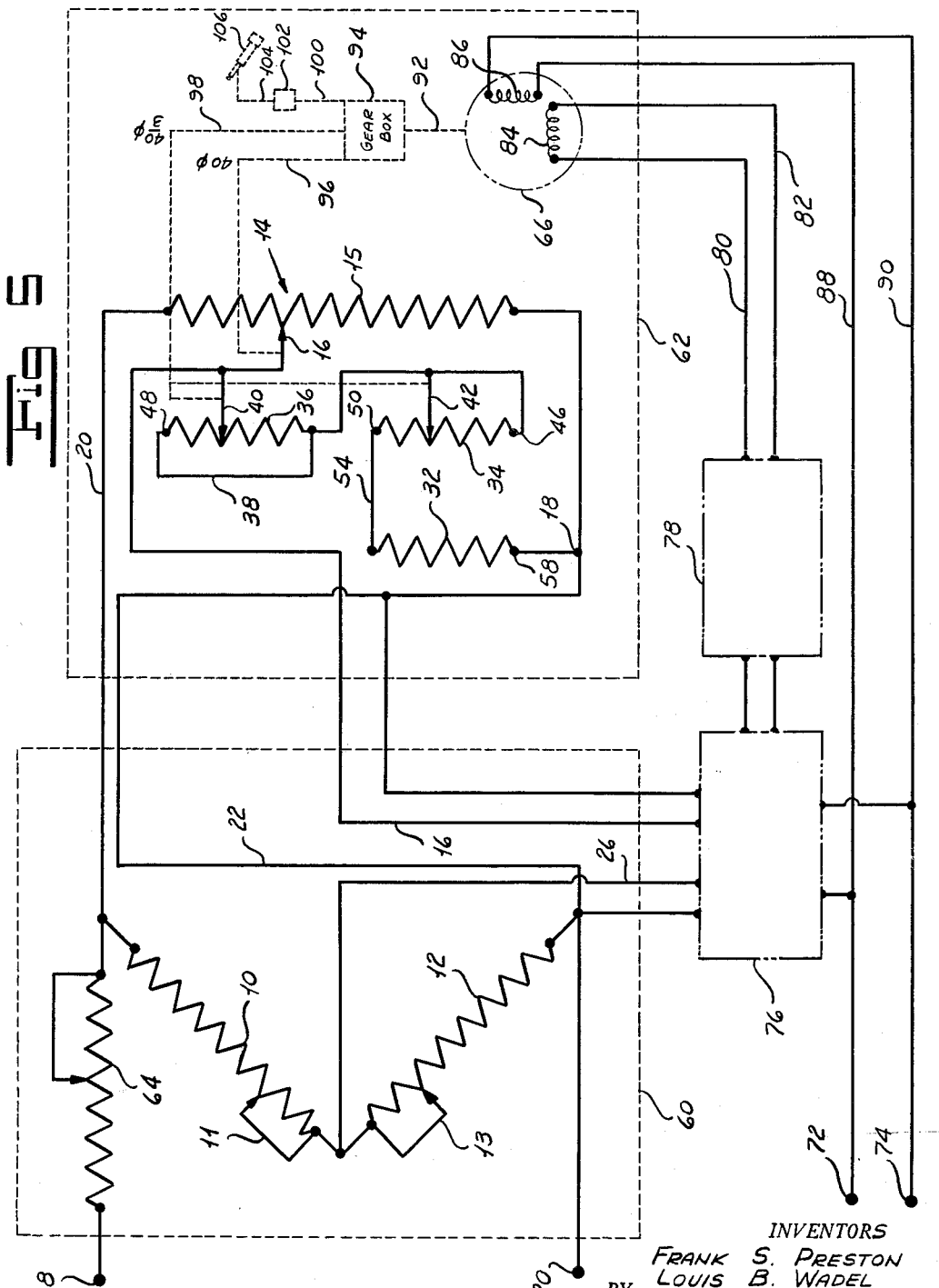

INVENTORS
FRANK S. PRESTON
LOUIS B WADEL
BY
Henry L. Shearer
ATTORNEY

March 20, 1956  F. S. PRESTON ET AL  2,738,924
ELECTRICAL ELEVATION ANGLE COMPUTER
Filed Jan. 18, 1950  4 Sheets-Sheet 4
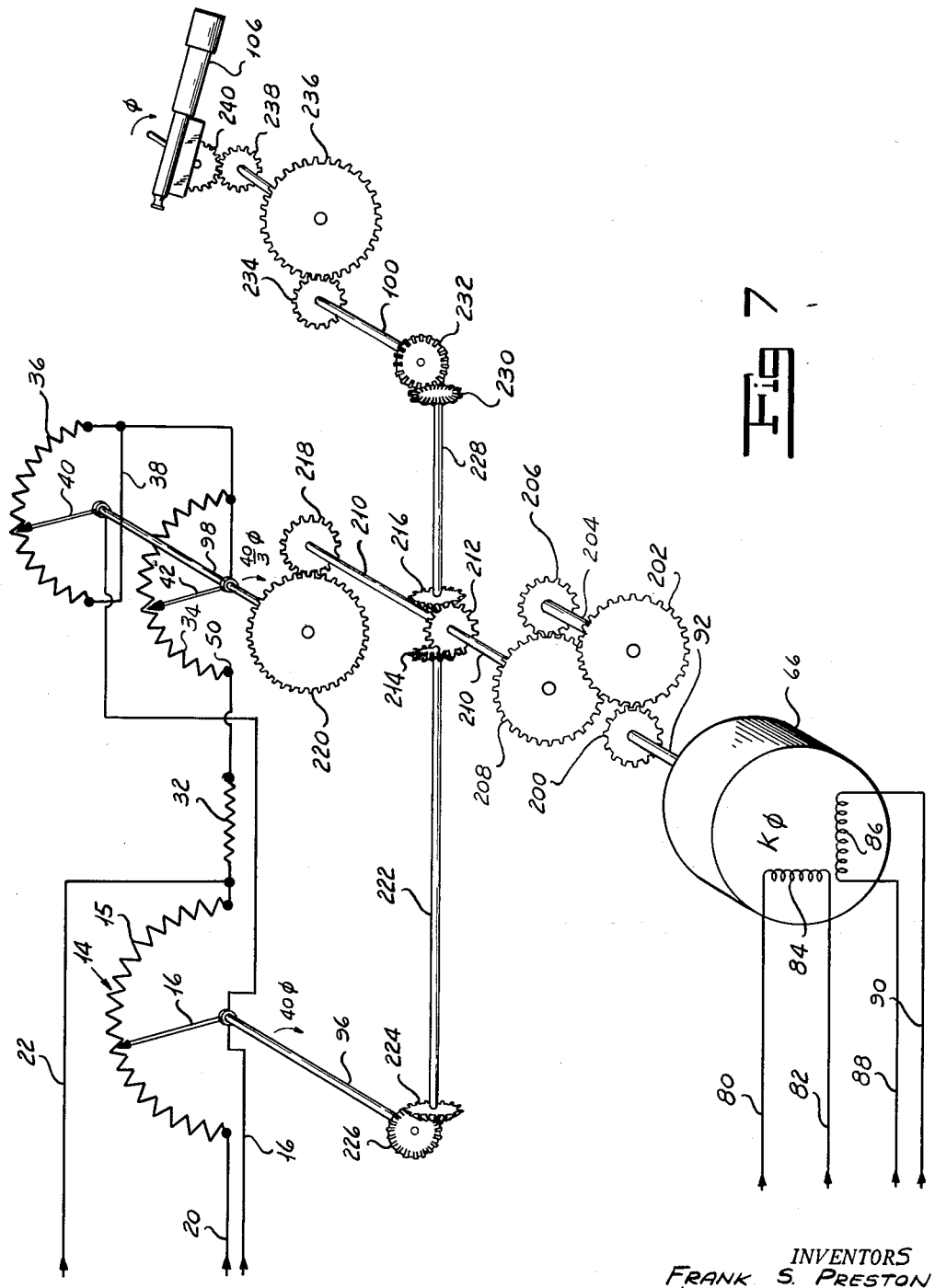
INVENTORS
FRANK S. PRESTON
LOUIS B. WADEL
BY
Henry L. Shevier
ATTORNEY

United States Patent Office 2,738,924
Patented Mar. 20, 1956

2,738,924

ELECTRICAL ELEVATION ANGLE COMPUTER

Frank S. Preston, Bedford Hills, N. Y., and Louis B. Wadel, Dallas, Tex., assignors, by mesne assignments, to Norden-Ketay Corporation, a corporation of Illinois Application January 18, 1950, Serial No. 139,314

13 Claims. (Cl. 235—61)

Our invention relates to electrical elevation angle computers and more particularly to an apparatus for rapidly computing an angle of a right triangle from the two sides adjacent the right angle.

For purposes of illustration and not by way of limitation, we will describe our invention as applied to the control of a sight mounted on an airplane to enable the sight to be directed at the elevation angle to a given point knowing the altitude of the airplane and its lateral displacement from the point.

Our invention has many applications, as for example in the use of bombsights when it is desired to direct a line of sight from an airplane to a given point which is the target or aiming point with reference to which bombs may be released from the airplane.

Many attempts have been made by the prior art to solve the problem of computing the elevation angle from an airplane to the target. These devices in general have been expensive to construct and difficult to maintain and operate. Then too, it has been found that at high altitudes the accuracy of the solution of the angle has been so reduced as to limit their usefulness. Furthermore, when it has been desired to control a part as a function of the elevation angle it has been necessary to resort to expensive and complicated equipment.

One object of our invention is to provide an electrical elevation angle computer which will obtain the actual angle from two sides of a right triangle in a simple, convenient, rapid and continuous manner.

Another object of our invention is to provide an electrical elevation angle computer which will solve the problem of obtaining the elevation angle with a high degree of accuracy.

Another object of our invention is to provide an electrical elevation angle computer for obtaining the elevation angle to any desired scale.

Another object of our invention is to provide an electrical elevation angle computer in which the scale is the function of speed of moving parts, thus enabling us to obtain a large scale with great accuracy by the use of higher speed moving parts.

Another object of our invention is to provide an electrical elevation angle computer which is compact in construction and in which the desired angle is capable of telemetric reproduction without the use of synchronous motors or other expensive equipment.

A further object of our invention is to provide an electrical elevation angle computer in which the construction is such that temperature errors tend to cancel each other.

Other and further objects of our invention will appear from the following description.

In general, our invention contemplates the provision of a bridge adapted to compute the elevation angle over a range from 0° to 90°, including means for automatically balancing the bridge such that the introduction of known values which are proportional to the altitude of the airplane and its range from a desired point will automatically generate the desired elevation angle. The two halves of the bridge may be separated by wide distances and a telescope or any other desired part may be automatically moved by a controlled prime mover to a position proportional to the elevation angle.

In the accompanying drawings which form part of the instant specification and which are to be read in conjunction therewith and in which like reference numerals are used to indicate like parts in the various views:

Figure 1 is a diagrammatic view showing the right triangle from which the elevation angle is computed.

Figure 2 is a diagrammatic view showing a bridge circuit with a compensating resistor in parallel with one of its arms illustrating the basic principle embodied in our invention.

Figure 3 is a diagrammatic view of a resistance network embodying the compensating resistor shown in Figure 2.

Figure 4 is a view of a bridge network including the complete bridge circuit containing one embodiment of our invention.

Figure 5 is a circuit diagram of the computer showing the arrangements of the resistors and illustrating one embodiment of our invention.

Figure 7 is a diagrammatic view showing the mechanical connections and the arrangement of the resistors as shown on the right-hand side of the bridge network illustrated in Figure 5.

Figure 6:
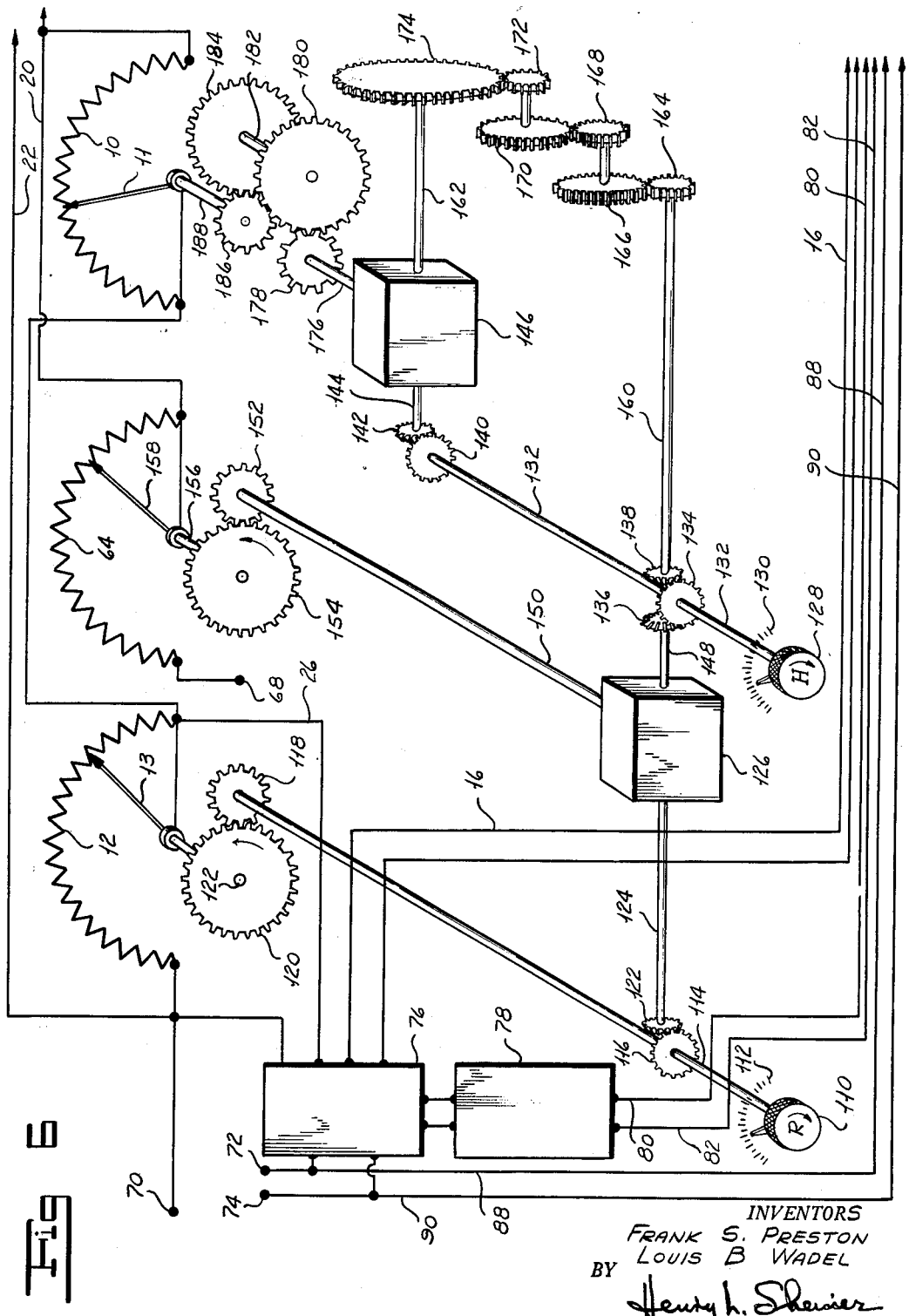
Figure 6 is a diagrammatic view showing the mechanical connections and the arrangement of the resistors shown on the left-hand side of the bridge network illustrated in Figure 5.

Referring now to Figure 1, the angle $\phi$ represents the elevation angle which is to be computed from the value H representing the altitude of the airplane above the ground, and the distance R representing the horizontal range of the point, directly below the airplane on the ground, P to the point T to which the elevation angle is to be computed from the values H and R.

Referring now to Figure 2, a bridge circuit is shown comprising a resistor 10 and a resistor 12 forming two arms of the bridge circuit. The circular resistor 14 is adapted to be engaged by a rotatable arm 16 dividing the complete resistor 14 into two segments. A potential represented by the letter E is impressed across the terminals 16 and 18 of the bridge circuit through conductors 20 and 22. An ammeter 24 is connected by conductor 26 to the terminal 28 of the bridge. A variable resistor 30 is connected from arm 16 to point 18 of the network in parallel with the lower segment of the circular resistor 14. The value of the lower segment of the circular resistor 14, which is a variable, is indicated by the reference numeral 15.

In the bridge circuit shown in Figure 2 let the resistor 10 be proportional to H of Figure 1. Let the value of resistor 12 be proportional to $\mu R$ where $$\mu = \frac{2}{\pi}$$

and R is proportional to R of Figure 1.

Let Z represent the value of the resistor 14. Let the angle between the arm 16 and the line from the pivot center of arm 16 to the point 18 represent $\alpha$. Then the value of the lower segment of the resistor 14 will be $\mu\alpha Z$. Let the value of the resistor 30 be $\psi Z$. It will be observed that the upper branch of the right-hand side of the bridge network will have a resistance the value of which is $Z - \mu\alpha Z$.

Moving the arm 16 to balance the bridge so that the current flowing through ammeter 24 is zero, we have the following relations:

$$(1) \quad \frac{\mu R}{H} = \frac{\mu\alpha Z^2}{\left(Z + \frac{\mu\alpha Z}{\psi}\right)(Z - \mu\alpha Z)}$$

or (2) $$\text{Tangent } \phi = \frac{\alpha}{\left(1+\frac{\mu\alpha}{\psi}\right)(1-\mu\alpha)}$$

If (3) $$\psi = \frac{\mu(1-\mu\alpha)}{\mu+\cot\alpha-\frac{1}{\alpha}}$$

then (4) $$\frac{\alpha}{\left(1+\frac{\mu\alpha}{\psi}\right)(1-\mu\alpha)} = \text{tangent } \alpha$$

so that from Equation 2

(5) $$\text{Tangent } \phi = \text{tangent } \alpha$$

and (6) $\alpha = \phi$ when $\phi$ is expressed in radians

Since the displacement of the arm 16 of the resistor 14 is proportional to $\alpha$, $\phi$ may be easily obtained to any desired scale through the use of suitable take-off gears from the shaft to which the arm 16 is secured.

There remains yet to generate the function $\psi$ of Equation 3. We plotted this function and found that it was within 0.1% error a parabola.

(7) $$y = -ax^2 - bx + c$$

where $$x = \frac{\phi°}{90}$$

In the resistance network shown in Figure 3 the resistor 32 is proportional to $c-a-b$. The resistor 34 is proportional to $a+b$. The resistor 36 is proportional to $a$. The resistor 36 has its ends short circuited by a conductor 38. A movable contact arm 40 makes contact with the resistor 36. A movable contact arm 42 is mechanically connected for movement with the contact arm 40 and makes contact with the resistor 34. The position of contact arms 40 and 42 are proportional to the angle $\phi$. When the angle $\phi$ is 0° the contact arm 40 will be at point 44 of the resistor 36, and the contact arm 42 will be at point 46 of the resistor 34. The lengths of the resistors are such that they extend through only 90° so that when the contact arm 40 is at the upper end of resistor 34 it will correspond to an angle $\phi$ of 90° and the arm 42 will be at the upper end 50 of the resistor 34. The short circuiting conductor 38 is connected by conductor 52 to the contact arm 42 and the upper end of resistor 34 is connected by conductor 54 to the upper end of resistor 32. It will be noted that the displacement of the movable contact arms, that is arm 42 above the point 46 and the arm 40 above the point 44, is proportional to $x$. Let the value of the resistance across the network of Figure 3, that is from point 56 the end of arm 40 to point 58 the lower end of resistor 32 equal $y$. This resistance can be expressed as follows:

(8) $$y = c - a - b + (a+b)(1-x) + ax(1-x)$$

Removing the parentheses and collecting terms, we obtain (9) $$y = c - bx - ax^2$$

which, it will be noted, is Equation 7, the desired parabola.

The proportional factor $\mu$ in the drive for resistor 12 of Figure 2 should be $2/\pi$. This may be approximated in any suitable manner. In the case illustrated with numerical values below, 7/11 was used. This approximation does not limit the accuracy of the solution of the angle.

In solving the equation, we found that the numerical values for $a$, $b$ and $c$ are as follows:

$$a = +0.143833Q$$
$$b = +0.171346Q$$
$$c = +0.9966313Q$$

where Q is the value of the resistor 14 in the bridge network shown in Figure 2.

From the foregoing, the value of the resistors in the network shown in Figure 3 should be as follows:

Resistor 32 $= c-a-b = +0.681452Q$
Resistor 34 $= a+b\ \ \ = +0.315180Q$
Resistor 36 $= a\ \ \ \ \ \ \ = +0.143833Q$ Referring now to Figure 4, we have shown a network similar to that shown in Figure 2 in which there has been substituted for the variable resistor 30 the network shown in Figure 3. We have found that by using the values given above for the resistors 32, 34 and 36, the error in the angle $\phi$ at balance is less than $\pm 5''$ of arc through the entire range from 0° to 90°.

An electrical circuit showing one embodiment of our invention is shown in Figure 5 to which reference is now made. The left-hand side of the bridge enclosed in the dotted line envelope indicated by the reference numeral 60 is located in the computer instrument proper which may be located in the navigator's compartment. The right-hand side of the bridge and associated mechanical parts shown enclosed in a dotted line envelope indicated by the reference numeral 62 may be located remote from the computer instrument proper at the bombardier's station at another position in the airplane. The resistor 12 is adjusted by means of variable arm 13 to the range. The resistor 10 is set to altitude by means of the variable arm 11. The resistor 64 is used to vary the supply voltage such that approximately constant output signal for a given error is achieved, enabling a smoother response of the servomotor 66 to be realized. A direct current voltage is impressed across the terminals of the bridge network through the posts 68 and 70. An alternating current potential is impressed across the posts 72 and 74 to supply the modulator and phase detector indicated by the reference numeral 76 to which the bridge signal is fed by conductors 26 and 16. It will be observed that instead of having a simple ammeter the signal produced by the bridge will be used automatically to bring the bridge into balance and simultaneously move a part as a function of the elevation angle being computed. The output signal from the modulator and phase detector 76 is fed to an amplifier and phase shifter indicated by the reference numeral 78, the output signal of which is led by conductors 80 and 82 across the rotor winding 84 of the two-phase motor indicated by the reference numeral 66, the stator winding 86 of which is supplied with the alternating current impressed across posts 72 and 74 by conductors 88 and 90. It will be seen that the signal produced by the bridge will be manifested by rotation of the shaft 92 of the motor 66 both in extent and direction. The alternating current frequency impressed across the posts 72 and 74 and the phase relations are such as to produce a high rotational speed of the shaft 92 of the motor 66. The effect of the high rotational speed of the motor is to give a large scale for the elevation angle, thus making for increased accuracy. The rotatable shaft 92 leads to a gear box indicated generally by the reference numeral 94 having three output shafts 96, 98 and 100. The gear ratios are such that output shaft 96 rotates at a speed of $40\phi$ and controls the variable contact arm 16, driving it into a position tending to balance the bridge. Shaft 98 rotates at a speed of $$\frac{40\phi}{3}$$

and drives both contact arm 40 to balance the bridge and contact arm 42 to the proper value of the $\psi$ (Equation 3) required at balance. The shaft 100 rotates at a speed of $8\phi$ and leads to a reducing gear box 102, the output of which appears on shaft 104. This shaft may drive the sight 106 to assume the desired elevation angle, or may drive an indicating pointer, or any other suitable device which it is desired to move as a function of the elevation angle being computed.

The construction may be more readily seen by reference to Figures 6 and 7, in which reference numerals corresponding to those used in Figure 5 are employed. In Figure 6 the parts enclosed in the rectangle 60 of Figure 5 and the modulator-phase detector and amplifier-phase shifter are shown. The resistor 12 is provided with a variable arm 13, the position of which sets the arm of the bridge as a function of the ground range, that is the distance between points P and T in Figure 1. A knob 110 is adapted to be manually operated adjacent a calibrated scale 112 to be set to the desired range. The knob 110 is adapted to rotate a shaft 114 to which is secured a bevel gear 116 and a gear 118. The gear 118 meshes with a gear 120 which is adapted to rotate a shaft 122 to which the variable arm 13 is secured. The ratio of gear 120 to gear 118 is 15 to 1. The bevel gear 116 meshes with a bevel gear 122 adapted to rotate the shaft 124 leading to a differential contained in a casing 126. The altitude H in Figure 1 is adapted to be set into the bridge through the setting knob 128 provided with a scale 130 calibrated in terms of altitude. The knob 128 rotates a shaft 132 to which is secured a bevel gear 134 meshing with bevel gears 136 and 138. A second bevel gear 140 is secured to the shaft 132 and meshes with a bevel gear 142 which rotates the shaft 144 leading to a second differential housed in casing 146. The bevel gear 136 is secured to a shaft 148 leading into the differential housed within the casing 126. The construction is such that a differential output shaft 150 will rotate as a function of $R-H$. The gear 152 secured to the shaft 150 meshes with a gear 154 which rotates shaft 156 to which variable arm 158 is secured. The arm 158 is adapted to vary the value of the resistance of resistor 64 included in the circuit. The potential is applied across post 68 leading to the end of resistor 64, and post 70 electrically connected to the end of resistor 12, which form a pair of terminals of the bridge network.

The bevel gear 138 actuated by the altitude knob 128 rotates the shaft 160 adapted to rotate the shaft 162 through a series of change gears 164, 166, 168, 170, 172 and 174. The change gears are adapted to give variable reductions in ratios from 1 to .04 to 1 to 2 in steps of .02. Corrections for departure from the design value of resistance versus rotation angle of resistors 10 and 12 are introduced by the change gears. In this case, the ratio selected drives variable arm 11 at the same scale in ohms per degrees as the drive for variable arm 13. The shafts 162 and 144 are input shafts to the differential housed in the casing 146. The output shaft 176 of the differential drives a gear 178 as a function of the altitude setting as corrected by the change gear setting. The gear 178 meshes with the gear 180 secured to a shaft 182 to rotate the gear 184 which meshes with the gear 186. The shaft 188 carrying the variable arm 11 is driven from the gear 186. The ratio of gear 178 to gear 180 is 1 to 15. The ratio of gear 184 to gear 186 is 22 to 7. The modulator and phase detector 76 is supplied with an alternating current potential from posts 74 and 72. The conductor 26 is connected to the junction between resistors 12 and 10. The output of the modulator and phase detector 76 forms the input to the amplifier and phase shifter 78, the output of which is led by conductors 80 and 82 to the winding 84 of the two-phase motor 66. The winding 86 of the two-phase motor is excited with the alternating potential from posts 70 and 74 led through conductors 88 and 90. The servomotor 66 drives the shaft 92 at a speed substantially greater than $\phi$, namely $K\phi$. The shaft 92 drives a gear 200 which meshes with a gear 202 which is in turn secured to a shaft 204 carrying a gear 206. The gear 206 meshes with a gear 208. The gears 202, 206 and 208 are located in the gear box 94 and serve to decrease the speed of the shaft 210 to $40\phi$. The shaft 210 carries a bevel gear 212 meshing with gears 214 and 216. It also carries a gear 218 which meshes with a gear 220. A shaft 98 is rotated by the gear 220. The ratio of gear 220 to gear 218 is 10 to 3 so that the shaft 98 will rotate at a speed of $$\frac{40\phi}{3}$$

The gears 220 and 218 are located in the gear box 94 shown in Figure 5. A shaft 222 is secured to the bevel gear 214 and carries a bevel gear 224 meshing with a bevel gear 226 which drives a shaft 96. Bevel gears 212, 214, 224 and 226 all have the same number of teeth so that the speed of rotation of shaft 96 will be $40\phi$. A shaft 228 carries a bevel gear 230 which meshes with a bevel gear 232 which carries a shaft 100. The gears 212, 214, 216, 224, 226, 230 and 232 are all located within the gear box 94. The output shaft 100 drives the reduction gear train comprising gears 234, 236, 238 and 240 to bring the motion of the sight 106 to the speed $\phi$ thus directing the sight to the desired angle.

The shaft 96 moves the variable arm 16 at a speed of $40\phi$ to change the proportion of the resistance arms of the bridge into which the resistor is divided. The shaft 98 moves both the variable arm 42 of resistor 34 and the variable arm 40 of resistor 36, thus generating the function of Equation 3 above.

It is believed that the operation of our computer will be clear from the foregoing description. The range may be readily ascertained by navigation and may be constantly set into the computer automatically by any means known to the art. It may, of course, be fed into the computer by hand by adjusting the knob 110 in Figure 6. The setting in of the range adjusts the value of the resistor 12 of the bridge arm. The altitude is obtained from any suitable altimeter known to the art and may be fed in mechanically or by hand through the knob 128 shown in Figure 6, thus setting the value of the bridge resistor arm 10. If the bridge is not at balance after the setting of the resistors 10 and 12 the signal produced by the unbalance of the bridge is led to the modulator and phase detector 76 and the resultant signal amplified by the amplifier and phase shifter 78. The output signal from the amplifier and phase shifter is impressed across the coil 84 of the two-phase motor 66 which drives the variable arm 16 and the variable arms 40 and 42 to effect a balance of the bridge network. Until balance is achieved the unbalance signal will cause the servomotor 66 to drive the balancing variable arms. The actual sight angle may be read from a calibrated scale and pointer moved by the shaft 104, or as described hereinabove the sight 106 may be moved to the desired sight angle.

The structure described can be employed as well to generate the tangent of a known angle. In using the apparatus described for a tangent generator the resistor 10 is replaced by a fixed precision resistor. The input is the angle whose tangent is desired. The servomotor instead of driving the variable arms 16, 40 and 42 will drive the variable arm 13 of the resistor 12 to balance so that the shaft position of the drive for variable arm 13 will be proportional to the tangent of the desired angle, as will be readily understood by those skilled in the art. The upper limit of the angles, of course, is determined by the ratio of the resistance of resistor 12 to the resistance of resistor 10. By using various values for resistor 10 any desired scale can be obtained.

It will be seen that we have accomplished the objects of our invention. We have provided a computer for obtaining the actual angle from two sides of a right triangle. We are enabled to do this with an accuracy of $\pm 5''$.

Our apparatus enables the desired angle to be obtained directly at any desired scale within reasonable limits. Since we may employ large scales we are enabled to obtain great accuracy without the use of a vernier. Our computer is compact for the high accuracy involved. The desired angle is capable of direct production telemetrically without the use of synchronous motors. The construction is such that temperature errors due to variations in resistance by the temperature coefficients tend to cancel each other. We have provided an elevation angle computer which is inexpensive to construct and easy to maintain and operate.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention what we claim is:

1. A device for computing an angle from its sine and cosine including in combination four variable resistors connected in a bridge circuit, the first of said resistors being adapted to be set to a resistance proportional to the cosine of the desired angle, the second of said resistors being adapted to be set to a resistance proportional to the sine of the desired angle, means for varying the resistances of the third and fourth resistors while maintaining the sum of their resistances constant, a fifth variable resistor shunted across said fourth resistor, means for varying the resistance of the fifth resistor, a source of electrical potential, means for impressing said potential across one pair of terminals of said bridge such that the first and second resistors are in series across the potential, means actuating said resistance varying means for the third and for the fourth resistors and said shunt resistor to balance the bridge and means operable as a function of said balancing means to indicate the desired angle whose tangent is determined by the values of the resistances of said first and second resistors.

2. A device as in claim 1 in which said shunting resistor comprising a resistance network adapted to generate the parabola $y=c-bx-ax^2$, where $x$ is proportional to the desired angle expressed in radians and $a$, $b$ and $c$ are constants.

3. A device as in claim 1 in which said shunting resistor comprising a resistance network adapted to generate a parabola $y=c-bx-ax^2$, where $x$ is proportional to the desired angle expressed in radians and $a$, $b$ and $c$ are constants expressed as a function of the constant resistance value of the sum of the resistances of the third and fourth resistors.

4. A device as in claim 1 in which said shunting resistor comprising a resistance network adapted to generate a parabola $$y=.9966313Q-(.171346Q)x-(.143833Q)x^2$$

where $Q$ is the constant resistance value of the sum of the resistances of the third and fourth resistors and $x$ is proportional to the desired angle expressed in radians.

5. A device as in claim 1 in which said shunting resistor includes a resistance network comprising a fixed resistor, a variable resistor and a variable short-circuited resistor connected in series, and means for varying the resistance of said variable resistor and said variable short-circuited resistor simultaneously.

6. A device as in claim 1 in which said variable shunt resistor includes a resistance network comprising a fixed resistor, a variable resistor and a variable short-circuited resistor connected in series, means for varying the resistance of said variable resistor and said variable short-circuited resistor simultaneously, the value of the resistance of said fixed resistor being .681452Q, the value of the maximum resistance of said variable resistor being .315180Q and the resistance value of the short-circuited resistor being .143833Q where Q is the constant resistance value of the sum of the resistances of said third and fourth resistors.

7. A device as in claim 1 in which said means for varying the resistances of said third and fourth resistors and said shunt resistor to balance the bridge includes a servomotor, means for controlling said servomotor as a function of the signal generated across the other pair of terminals of said bridge and means controlled by said servomotor for varying the resistances of said third and fourth resistors and said shunt resistor to bring the bridge to balance and to reduce the controlling signal to zero.

8. A device as in claim 1 in which said means for varying said third and fourth resistors and said shunt resistor to balance said bridge includes a servomotor, a modulator for modulating the signal generated across the other pair of terminals of said bridge, an amplifier, means for feeding the modulated bridge signal to the amplifier as an input signal, means for controlling the servomotor by the output signal from the amplifier and means controlled by the servomotor for varying the resistances of said third, fourth and fifth resistors to bring the bridge to balance and reduce the bridge signal to zero.

9. An angle computer including in combination a Wheatstone bridge having a first resistor adapted to be set to a resistance value proportional to the cosine of the desired angle, a second resistor adapted to be set to a resistance value proportional to the sine of the desired angle, a third resistor having a variable resistance and a fourth resistor having a variable resistance, said resistors being connected to form a bridge, means varying the resistances of the third and fourth resistors while maintaining the sum of their resistances constant, a variable resistance network shunted across said fourth resistor said variable resistance network comprising a fixed resistor, a variable resistor and a variable short-circuited resistor connected in series, means for varying the resistance across said shunt network, a source of electrical potential, means for impressing said potential across one pair of terminals of said bridge such that the potential is impressed across the first and second resistors in series, a servomotor, means controlled by said servomotor for actuating the resistance varying means of said third and fourth resistors and of the shunt network, means connected across the other pair of terminals of said bridge for controlling said servomotor and means controlled by said servomotor for indicating the desired angle.

10. A computer as in claim 9 in which said means for indicating the desired angle includes an optical element.

11. A computer as in claim 9 in which said means controlled by said servomotor includes transmission gears adapted to decrease the amplitude of motion of the resistance adjusting means with respect to the amplitude of motion of the servomotor, said transmission having three output shafts, the first of said output shafts moving at the highest rate and connected to control the reciprocal values of said third and fourth resistances, the second of said output shafts moving at a slower rate than said first output shaft adapted to control both the shunted variable resistor and the variable resistor of the shunting resistance network, and a third output shaft adapted to move proportional to a variation in the desired angle adapted to indicate the angle being computed.

12. A computer as in claim 9 including means for setting said first resistor to a resistance value proportional to the cosine of the desired angle, and means for varying the operation of said setting means as a function of the first resistor.

13. A computer as in claim 9 including means for setting the resistance value of said first resistor as a function of the cosine of the desired angle, means for setting the resistance of said second resistor as a function of the sine of the desired angle, a sixth variable resistor in series with one of the bridge terminals across which the electrical potential is impressed and differential means operable by both said first and second setting means for varying the value of the resistance of the sixth resistor.

References Cited in the file of this patent

UNITED STATES PATENTS

| | | |
|---|---|---|
| 406,830 | Fiske | July 9, 1889 |
| 1,261,086 | Wilson et al. | Apr. 2, 1918 |
| 1,533,356 | Todd | Apr. 14, 1925 |
| 1,542,534 | Schneider | June 16, 1925 |
| 2,144,216 | Broome | Jan. 17, 1939 |
| 2,407,325 | Parkinson | Sept. 10, 1946 |
| 2,436,666 | Perry | Feb. 24, 1948 |
| 2,476,384 | Razek | July 19, 1949 |
| 2,614,327 | Russell | Oct. 21, 1952 |

FOREIGN PATENTS

| | | |
|---|---|---|
| 313,738 | Italy | June 4, 1934 |
| 921,205 | France | Apr. 30, 1947 |

OTHER REFERENCES

"Bridge Type Electrical Computers," Ergen, Review of Scientific Instruments, vol. 18, No. 8, August 1947, pp. 564–567, inclusive.

"Electronic Instruments," Greenwood, Holdam, McRae, MIT Radiation Laboratory Series, vol. 21, McGraw-Hill Pub. Co., April 20, 1948, pp. 102–103, incl.